United States Patent [19]
Rakich et al.

[11] 3,737,979
[45] June 12, 1973

[54] METHOD OF MANUFACTURING LONGITUDINALLY WELDED STRIPS OF DIFFERENT THICKNESSES AND WIDTHS

[75] Inventors: Antone F. Rakich, Waterbury; Luis J. Lozano, Southington; John A. Nelmes, Waterbury, all of Conn.

[73] Assignee: Anaconda American Brass Company, Waterbury, Conn.

[22] Filed: Aug. 5, 1971

[21] Appl. No.: 169,203

[52] U.S. Cl. .................... 29/480, 72/366, 219/102
[51] Int. Cl. ............................................. B23k 31/02
[58] Field of Search ................... 29/475, 482, 480; 219/102, 105, 57; 72/366

[56] References Cited
UNITED STATES PATENTS

| | | | |
|---|---|---|---|
| 155,088 | 9/1874 | Howe | 29/480 X |
| 1,773,068 | 8/1930 | Vienneau | 29/482 X |
| 1,857,505 | 5/1932 | Heineman | 219/105 X |
| 2,036,041 | 3/1936 | Granfield et al. | 219/83 |
| 2,850,798 | 9/1958 | Bowman et al. | 29/482 |
| 2,961,762 | 11/1960 | Clark et al. | 29/475 |
| 3,488,989 | 1/1970 | Rakich et al. | 72/366 |
| 3,628,235 | 12/1971 | Willoughby | 29/480 |

Primary Examiner—J. Spencer Overholser
Assistant Examiner—Richard Bernard Lazarus
Attorney—Dean S. Edmonds, Willis H. Taylor and Charles E. McKenney

[57] ABSTRACT

A composite flat metal strip having portions of different thicknesses is produced by welding together strips of the different thicknesses along their adjacent edges and by rolling both thicknesses of the composite welded strip to a final stepped cross-section.

4 Claims, 5 Drawing Figures

PATENTED JUN 12 1973          3,737,979

INVENTORS
ANTONE F. RAKICH
LUIS J. LOZANO
JOHN A. NELMES

BY Pennie Edmonds
Morton, Taylor & Adams
ATTORNEYS

METHOD OF MANUFACTURING LONGITUDINALLY WELDED STRIPS OF DIFFERENT THICKNESSES AND WIDTHS

BACKGROUND OF THE INVENTION

It is known to produce copper electrical connectors in strip form having a dual gauge, that is, having portions of two distinct thicknesses integrally connected. For many years, such dual gauge strips were produced by the use of milling techniques, which was expensive and time-consuming. U. S. Pat. No. 3,488,989 discloses an improved method of producing dual gauge strips by passing flat copper stock through a set of opposed rolls one of which has stepped diameters. This method can be performed at high production rates and eliminates the waste attendant upon the milling operation. However, this method is not entirely satisfactory or even sometimes possible when the dual gauge difference to be produced is quite great or when the width of the thinner gauge portion exceeds that of the heavier gauge portion.

It is the purpose of the present invention to disclose a method of forming a composite dual gauge strip which is particularly useful in producing strip under the above-mentioned conditions.

SUMMARY OF THE INVENTION

In accordance with the present invention, the method of producing a unique composite metal strip having at least two different thicknesses comprises the steps of: abutting along their edges two metal strips of different thicknesses of the same or of different metals, welding said strips together along their abutting edges, and rolling both thicknesses of the composite welded strip to a final stepped cross-section. Particular advantages are achieved if each thickness of the composite welded strip is subjected to the same percentage reduction in cross-sectional area during the rolling operation since curvature distortion of the finished strip can thereby be avoided.

The method of the invention is particularly useful when it would be impossible or unsatisfactory to produce dual gauge strip of certain dimensional ratios, for example, where the difference in thicknesses between heavier and lighter gauge sections is quite great, (for example, where the thinner gauge strip is less than half the thickness of the adjacent heavier gauge strip); and is particularly useful where the width of the thinner gauge section is to exceed that of the heavier gauge section.

DESCRIPTION OF PREFERRED EMBODIMENT

Figure 1:
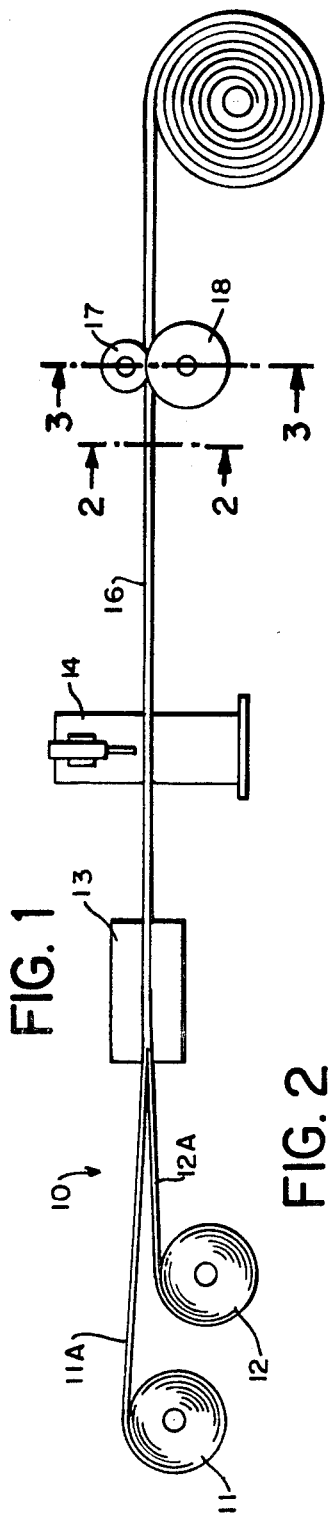
FIG. 1 is a schematic representation of the method and apparatus for producing a composite, welded dual gauge strip according to the principles of the present invention.

Referring to the drawing, FIG. 1 illustrates an apparatus 10 suitable for producing a welded dual gauge strip in accordance with the present invention. Apparatus 10 includes supply reels 11 and 12 upon which are wound respectively flat metal stock such as copper, for example, of different thicknesses and widths. In the illustrated embodiment, strip 11A is of heavier thickness and width than strip 12A. The strips 11A and 12A are fed between an aligning device 13 which causes the strips 11A and 12A to pass therethrough in side-by-side relationship with the adjacent edges of the strips abutting. The strips in this position next pass under an electric welder 14 which joins the strips along their adjacent edges using a conventional welding techniques applicable to the materials and thicknesses involved.

Figure 2:
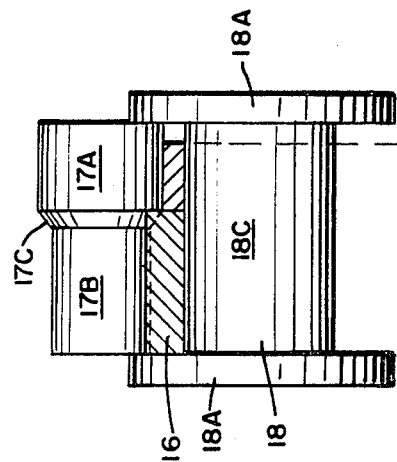
FIGS. 2 and 3 are respectively sections taken in the direction of arrows 2—2 and 3—3 of FIG. 1.
Figure 3:
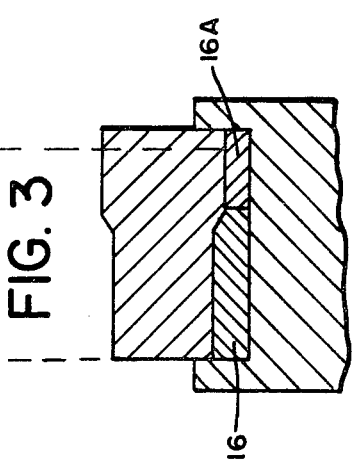

The composite dual gauge strip 16 after welding is subjected to a rolling operation by being passed between opposing rollers 17 and 18. Rollers 17 as shown in FIGS. 2 and 3 have different diameters 17A, 17B interconnected by a bevelled portion 17C. Roller 18 has enlarged diameter edge or collar portions 18A and a central portion 18C. The latter defines together with roller 17 a stepped nip conforming to the different diameters of roller 17.

As seen in FIG. 3, the strip 16 while passing between rollers 17 and 18 will be subjected to being rolled and finished to prescribed dimensions. During this step, the welded seam 16A will be rolled flat and the material of the strip will be work-hardened in accordance with known principles of metallurgy. As one aspect of the present invention, if each thickness of the composite welded strip is subjected to the same percentage reduction in cross-sectional area during the rolling operation, any tendency for differential distortion of the strip due to rolling will be minimized. and uniform hardness will be obtained.

Figure 4:
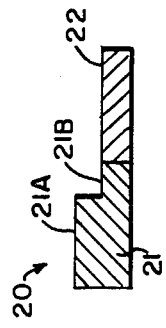
FIG. 4 is a sectional detail showing one form of composite dual gauge welded strip according to the present invention.

In the embodiment of FIG. 4, a composite dual strip 20 has been illustrated formed according to the method of the present invention, in a somewhat different manner. The strip 20 furthermore consists of a dual gauge section 21, a single gauge section 22 welded thereto. The dual gauge section has a heavy gauge portion 21A and a thinner gauge portion 21B, the latter having the same thickness as the adjacent section 22. The section 21 has preferably been formed using the rolling method of U. S. Pat. No. 3,488,989 which as mentioned, has certain limitations in forming dual gauge strips should the thinner gauge portion be more than half the total width of the dual gauge strip. In such cases. it is therefore possible to combine the rolling method to produce a dual gauge strip such as section 21 of FIG. 4 and using the technique of the present invention to add thinner gauge strip section 22 thereto, with a final rolling operation to finished gauge.

Figure 5:
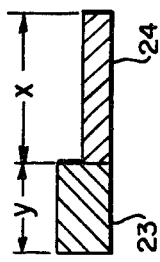
FIG. 5 is a second composite dual gauge strip according to the present invention.

In the embodiment of FIG. 5, a dual gauge strip similar to that shown in FIG. 4 is formed solely by using the welding and finish rolling technique of the present invention. The composite strip of FIG. 5 comprises a section 23 whose thickness is approximately twice that of adjacent section 24 and whose width Y is approximately half that of the width X of the adjacent thinner gauge section 24. No difficulty is encountered in producing a composite strip having the described dimensional variations by welding the different strips 23 and 24 along adjacent edges and rolling the composite strip to prescribed finished dimensions.

The present invention makes possible the formation of dual gauge composite strips wherein each gauge portion of different gauge is of a different metal. It is furthermore possible using the present invention's techniques to form a composite strip having more than two different thicknesses. The strips of different thickness can be straight as shown in the embodiment of FIGS. 1–3, or contoured to prescribed curvatures before or after being welded into composite form.

It will be understood that the above description has been of particular embodiments of the present invention and is therefore representative. In order to appreciate the scope of the invention, reference should be made to the appended claims.

We claim:

1. The method of continuously producing a composite metal strip having a stepped cross-section of at least two substantially different thicknesses which comprises placing two metal strips of different thicknesses in longitudinal edge to edge relationship, welding said strips together along their adjacent edges thus forming a strip of a first stepped cross-section, and rolling both thicknesses of the resulting composite welded strip to reduce the thickness of both strips to a final stepped cross-section.

2. The method according to claim 1 wherein each thickness of the composite welded strip is subjected to the same percentage reduction in cross-sectional area during the rolling operation.

3. The method according to claim 1 wherein the strip of greater thickness is formed with an edge portion of reduced thickness, said edge portion being in thickness at least half as thick and in width less than half the width of the remainder of the strip, and a separate strip of substantially the same thickness as said reduced edge portion is welded thereto in edge to edge relationship.

4. The method according to claim 1 wherein the two metal strips are of dissimilar compositions.

* * * * *